(12) United States Patent
Gao et al.

(10) Patent No.: US 9,419,698 B2
(45) Date of Patent: Aug. 16, 2016

(54) ANTENNA CALIBRATION METHOD, SYSTEM AND APPARATUS

(71) Applicant: CHINA ACADEMY OF TELECOMMUNICATIONS TECHNOLOGY, Haidian District Beijing (CN)

(72) Inventors: Qiubin Gao, Beijing (CN); Ranran Zhang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 67 days.

(21) Appl. No.: 14/379,072

(22) PCT Filed: Feb. 6, 2013

(86) PCT No.: PCT/CN2013/071451
§ 371 (c)(1),
(2) Date: Aug. 15, 2014

(87) PCT Pub. No.: WO2013/120429
PCT Pub. Date: Aug. 22, 2013

(65) Prior Publication Data
US 2015/0341096 A1 Nov. 26, 2015

(30) Foreign Application Priority Data
Feb. 16, 2012 (CN) .......................... 2012 1 0035678

(51) Int. Cl.
*H04B 7/06* (2006.01)
*H04B 7/04* (2006.01)
(Continued)

(52) U.S. Cl.
CPC .............. *H04B 7/0615* (2013.01); *H04B 1/56* (2013.01); *H04B 7/0413* (2013.01);
(Continued)

(58) Field of Classification Search
CPC ..................... H04L 25/03343; H04L 25/0204; H04L 27/2601; H04L 25/0224; H04L 1/0656; H04L 27/2608; H04L 25/0206; H04B 7/063; H04B 7/0634; H04B 7/0689
See application file for complete search history.

(56) References Cited

U.S. PATENT DOCUMENTS

| 2003/0072382 A1* | 4/2003 | Raleigh | H04B 7/0615 |
| | | | 375/267 |
| 2007/0064830 A1* | 3/2007 | Choi | H04B 7/0634 |
| | | | 375/267 |

(Continued)

FOREIGN PATENT DOCUMENTS

| CN | 1910879 A | 2/2007 |
| CN | 102149123 A | 8/2011 |

(Continued)

OTHER PUBLICATIONS

International Search Report of PCT/CN2013/071451, mailed on May 16, 2013, 6 pages.
(Continued)

*Primary Examiner* — Jung-Jen Liu

(74) *Attorney, Agent, or Firm* — Kilpatrick Townsend & Stockton LLP

(57) ABSTRACT

An embodiment of the present invention relates to the technical field of wireless communications, in particular to an aerial calibration method, system and device. In the prior art, an air interface calibration method involving a user equipment (UE) requires the UE to feed back a channel coefficient, and a channel coefficient direct quantization method occupies a great deal of uplink overhead and reduces system efficiency. The present invention solves the above problem. The method in the embodiment of the present invention comprises: the UE measures a downlink channel and determines a downlink channel matrix; the UE determines a first weighting matrix for aerial calibration according to the downlink channel matrix; the UE notifies a network side of the determined first weighting matrix. In the embodiment of the present invention, a UE decomposes the characteristic value of the downlink channel matrix, or reports the identifier corresponding to the first weighting matrix to the network side device, thus reducing the occupied uplink overhead and improving system efficiency.

20 Claims, 8 Drawing Sheets

(51) Int. Cl.
*H04B 1/56* (2006.01)
*H04W 24/02* (2009.01)
*H04B 17/21* (2015.01)
*H04B 7/02* (2006.01)
*H04L 25/02* (2006.01)
*H04L 5/00* (2006.01)

(52) U.S. Cl.
CPC ........... *H04B 7/0417* (2013.01); *H04B 7/0617* (2013.01); *H04B 7/0634* (2013.01); *H04B 17/21* (2015.01); *H04W 24/02* (2013.01); *H04B 7/024* (2013.01); *H04L 5/0023* (2013.01); *H04L 5/0048* (2013.01); *H04L 25/0204* (2013.01); *H04L 25/0224* (2013.01)

(56) References Cited

U.S. PATENT DOCUMENTS

2007/0286303 A1* 12/2007 Yamaura .............. H04B 7/0421
  375/267
2010/0008406 A1* 1/2010 Sawai ............... H04L 25/03006
  375/219
2010/0020891 A1* 1/2010 Takano ............... H04L 25/0204
  375/260
2013/0114459 A1* 5/2013 Luo ........................ H04B 17/12
  370/252
2013/0114468 A1* 5/2013 Hui ..................... H01Q 3/2611
  370/277

FOREIGN PATENT DOCUMENTS

| | | |
|---|---|---|
| CN | 102291189 A | 12/2011 |
| WO | 02-32000 A1 | 4/2002 |
| WO | 0232000 A1 | 4/2002 |

OTHER PUBLICATIONS

The Office Action issued on Apr. 23, 2015 in the CN counterpart application (201210035678.4).

* cited by examiner

ANTENNA CALIBRATION METHOD, SYSTEM AND APPARATUS

This application is a US National Stage of International Application No. PCT/CN2013/071451, filed on 16 Feb. 2012, designating the United States, and claiming the benefit of Chinese Patent Application No. 201210035678.4, filed with the Chinese Patent Office on Feb. 16, 2012 and entitled "Antenna Calibration Method, System and Apparatus", which is hereby incorporated by reference in its entirety.

FIELD

The present invention relates to the field of wireless communications and particularly to an antenna calibration method, system and apparatus.

BACKGROUND

A Multiple-Input Multiple-Output (MIMO) system refers to a system with multiple antennas installed at both a transmitting terminal and a receiving terminal. A gain of array processing and a gain of diversity can be further achieved by introducing processing in the space domain to the MIMO system in addition to traditional processing in the time and frequency domains. In the MIMO system, if the transmitter can obtain information about a channel somehow, then it can optimize a transmission signal in view of a characteristic of the channel to thereby improve the quality of reception and lower the requirement of complexity on a receiver. Linear pre-coding/beam-forming as one of optimization schemes is a working approach to deal with the fading channel lower the error probability and improve the performance of the system.

With multiple-antenna linearly pre-coded/beam-formed transmission, information about a channel from a base station to a UE is one of important factors influencing the performance of the system. In a Frequency Division Duplex (FDD) system, the UE feeds the estimated information about the channel back to the base station over the uplink channel by consuming a significant resource of the uplink channel and possibly introducing a quantization error, etc. In a Time Division Duplex (TDD) system, uplink and downlink signals are transmitted in the same frequency band and therefore reciprocity of the uplink and downlink channels holds. The so-called reciprocity refers to that the uplink channel is the same as the downlink channel. The uplink channel can be estimated from the uplink signal transmitted by the UE due to the reciprocity of the uplink and downlink channels to thereby obtain information about the downlink channel while saving a significant portion of feedback overhead.

The reciprocity of channels applies to physical channels propagating in space. A signal needs to be transmitted by a transmitter circuit to an antenna after being processed at baseband, and a signal received from the antenna also needs to be sent by a receiver circuit to the baseband. Generally the transmitter circuit and the receiver circuit are two different circuits, so temporal delays and amplitude gains introduced by the transmitter circuit and the receiver circuit may be different, that is, the transmitter and receiver circuits may not match with each other. The reciprocity of uplink and downlink channels may not be strictly applicable due to the mismatch between the transmitter circuit and the receiver circuit.

A method of cancelling out an influence arising from the mismatch between uplink and downlink circuits is antenna calibration in which a calibration factor is calculated from information reported by the UE and/or information measured by the base station and the channel estimated from the uplink signal is compensated for and adjusted or data to be transmitted is compensated for and adjusted.

Coordinated Multipoint Transmission/Reception (CoMP) refers to coordination between multiple base stations separated in geographical location. The multiple base stations are base stations in different cells or multiple separate bases stations in one cell. Coordinated multipoint transmission/reception is categorized into coordinated downlink transmission and joint uplink reception. Coordinated multipoint downlink transmission is generally categorized into coordinated scheduling and joint transmission. Coordinated scheduling refers to the coordination of time, frequency and space resources between the cells to thereby avoid and lower their interference to each other. Inter-cell interference is a predominant factor restricting the performance of a UE at the edge of a cell, so coordinated scheduling can improve the performance of the UE at the edge of the cell by lowering inter-cell interference. As illustrated in FIG. 1A, coordinated scheduling of three cells can schedule three UEs with possible interference to each other onto resources orthogonal to each other to thereby avoid inter-cell interference effectively.

In a joint transmission scheme, data is transmitted concurrently by multiple cells to a UE to thereby enhance the reception of signals by the UE. As illustrated in FIG. 1B, data is transmitted by three cells to a UE over the same resource, and the signals of the multiple cells are received concurrently by the UE. The superimposition of the useful signals from the multiple cells can improve the quality of the received signals by the UE on one hand and lower the interference to the UE on the other hand to thereby improve the performance of the system.

In analogy to single-cell multiple-antenna transmission, whether coordinated multipoint transmission/reception can be performed effectively depends upon channel state information that can be obtained at a transmitting terminal. The quality of signals can be improved and inter-cell interference can be suppressed by linear pre-coding (i.e., beam-forming) at the transmitting terminal after obtaining the ideal channel state information. The transmitting terminal can obtain the channel state information from a feedback of a user equipment, but the channel feedback may consume a valuable uplink spectrum resource to thereby lower the uplink spectrum efficiency, which may be particularly apparent in coordinated multipoint transmission/reception because each base station participating in coordinated transmission needs to obtain the channel state information of the user equipment, so there may be a feedback overhead increasing linearly with the number of coordinating base stations. Required precision of the channel state information may also be higher with a particular transmission scheme, which will mean a larger uplink bandwidth resource to be occupied. Also the channel state information may be fed back inevitably with a quantization error due to a limited capacity of the uplink channel. The quantization error may lower the performance of coordinated multipoint transmission/reception. The channel state information can be obtained in the TDD system due to the reciprocity of channels as a very competitive solution without incurring any extra feedback overhead and without introducing any quantization error due to the feedback. The CoMP solution based on the reciprocity of channels may also be faced with required antenna calibration.

Uplink and downlink antenna calibration of the same base station can be well performed by self-calibration in the practical system, but there has been no working approach to address antenna calibration between base stations, so that the uplink and downlink reciprocity of joint channels of the multiple base stations may not be strictly applicable. Without the satisfactory uplink and downlink reciprocity, downlink joint channels of the multiple base stations cannot be obtained based upon a measured uplink channel in the TDD system, thus failing to make use of the advantage of the TDD system.

In summary, the user equipment involved in existing calibration method over the air interface is required to feed back channel coefficients which have to be quantized directly with a significant uplink overhead, thus degrading the efficiency of the system.

SUMMARY

Embodiments of the invention provide an antenna calibration method, system and apparatus so as to address the problem in the prior art that the user equipment involved in calibration of an air interface is required to feed back channel coefficients which have to be quantified directly at a significant uplink overhead, thus degrading the efficiency of the system.

An embodiment of the invention provides an antenna calibration method including: a user equipment performing downlink channel measurement and determining a downlink channel matrix;

the user equipment determining a first weight matrix for antenna calibration based on the downlink channel matrix; and the user equipment notifying the network side of the determined first weight matrix.

An embodiment of the invention provides another antenna calibration method including:

a network-side apparatus performing uplink channel measurement and determining an uplink channel matrix;

the network-side apparatus determining calibration coefficients based on the uplink channel matrix and a received first weight matrix from a user equipment; and the network-side apparatus performing antenna calibration based on the determined calibration coefficients.

An embodiment of the invention provides an antenna calibration user equipment including:

a downlink matrix determination module configured to perform downlink channel measurement and to determine a downlink channel matrix;

a weight matrix determination module configured to determine a first weight matrix for antenna calibration based on the downlink channel matrix; and a notification module configured to notify the network side of the determined first weight matrix.

An embodiment of the invention provides an antenna calibration network-side apparatus including:

an uplink matrix determination module configured to perform uplink channel measurement and to determine an uplink channel matrix;

a coefficient determination module configured to determine calibration coefficients based on the uplink channel matrix and a received first weight matrix from a user equipment; and a calibration module configured to perform antenna calibration based on the determined calibration coefficients.

An embodiment of the invention provides an antenna calibration system including:

a user equipment configured to perform downlink channel measurement, to determine a downlink channel matrix, to determine a first weight matrix for antenna calibration based on the downlink channel matrix and to notify the network side of the determined first weight matrix; and a network-side apparatus configured to perform uplink channel measurement, to determine an uplink channel matrix, to determine calibration coefficients based on the uplink channel matrix and the received first weight matrix from the user equipment and to perform antenna calibration by the determined calibration coefficients.

The user equipment according to the embodiment of the invention performs eigen value decomposition on the downlink channel matrix or reports the identifier corresponding to the first weight matrix to the network-side apparatus to thereby lower a consumed uplink overhead and improve the efficiency of the system.

Furthermore antenna calibration can be performed between base stations in the embodiments of the invention to thereby improve the performance of the system without the applicability of the reciprocity of uplink and downlink channels in the system; and with an application to the TDD system, the TDD system can obtain downlink joint channels of the multiple base stations based upon a measured uplink channel without the applicability of the reciprocity of uplink and downlink channels in the system to thereby improve the performance of coordinated multipoint transmission/reception so as to make full use of the advantage of TDD.

DETAILED DESCRIPTION

A user equipment according to an embodiment of the invention performs downlink channel measurement and determines a downlink channel matrix; the user equipment determines a first weight matrix for antenna calibration based on the downlink channel matrix; and the user equipment notifies the network side of the determined first weight matrix. Since the user equipment according to the embodiment of the invention performs eigen value decomposition on the downlink channel matrix or reports the identifier corresponding to the first weight matrix to a network-side apparatus to thereby lower a consumed uplink overhead and improve the efficiency of the system.

Embodiments of the invention will be further described below in details with reference to the drawings.

In the following description, firstly an implementation with cooperation of the network side and the user equipment side will be described, and finally implementations at the network side and the user equipment side will be described respectively, but this will not suggest required cooperation of both the sides for an implementation, and in fact, problems present respectively at the network side and the user equipment side will also be addressed in the separate implementations at the network side and the user equipment side, although a better technical effect can be achieved in the implementation with cooperation of both the sides.

Figure 1A:
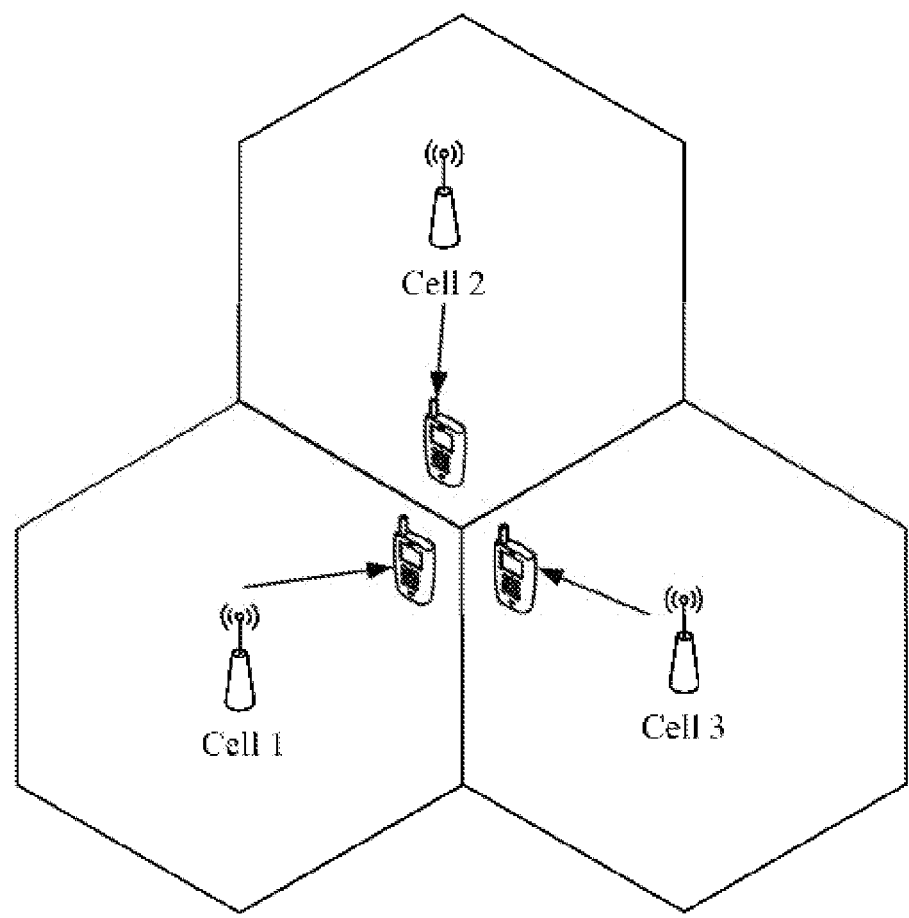
FIG. 1A is a schematic diagram of coordinated scheduling in the prior art.
Figure 1B:
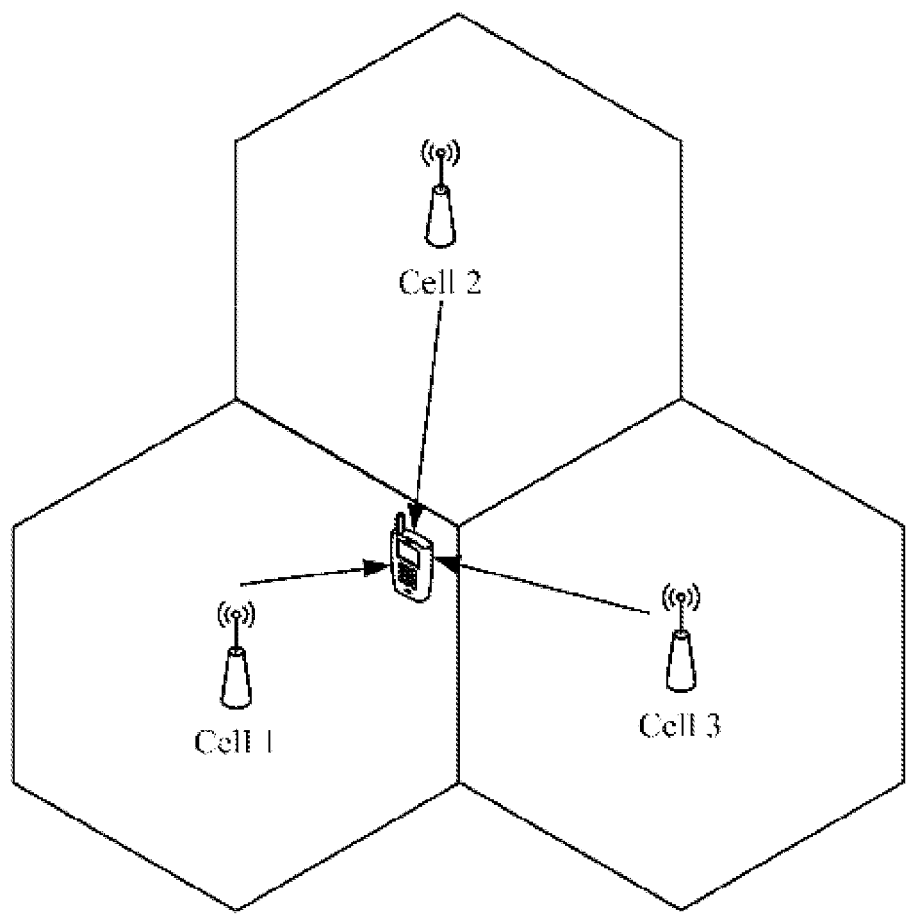
FIG. 1B is a schematic diagram of coordinated scheduling in the prior art.
Figure 2:
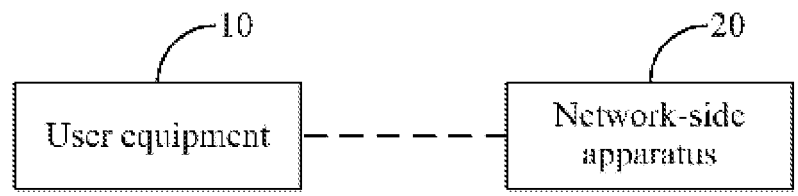
FIG. 2 is a schematic structural diagram of an antenna calibration system according to an embodiment of the invention.

As illustrated in FIG. 2, an antenna calibration system according to an embodiment of the invention includes a user equipment 10 and a network-side apparatus 20.

The user equipment 10 is configured to perform downlink channel measurement, to determine a downlink channel matrix, to determine a first weight matrix for antenna calibration based on the downlink channel matrix and to notify the network side of the determined first weight matrix; and The network-side apparatus 20 is configured to perform uplink channel measurement, to determine an uplink channel matrix, to determine calibration coefficients based on the uplink channel matrix and the received first weight matrix from the user equipment and to perform antenna calibration by the determined calibration coefficients.

In an implementation, the network-side apparatus 20 can select the specific user equipment 10 for participation in calibration by performing measurement and making a feedback as required for calibration. The selected user equipment 10 can be a user equipment 10 with a good channel quality and at a low movement speed. Prior to this, the user equipment 10 can report whether it supports the ability of measurement and feedback as required for calibration; the network-side apparatus 20 can alternatively judge from a version of the user equipment 10 whether it supports the ability of measurement and feedback as required for calibration.

Preferably the network-side apparatus 20 notifies the user equipment 10 of a frequency range and/or specific sub-frames for downlink channel measurement;

Correspondingly the user equipment 10 performs downlink channel measurement in the frequency range notified by the network side and/or the specific sub-frames notified by the network side.

Particular implementations will be described below.

1. The network-side apparatus 20 notifies the user equipment 10 of the frequency range for downlink channel measurement.

There is a pilot for calibration measurement, transmitted by the network-side apparatus 20, in the frequency range; and the network-side apparatus 20 configures semi-statically the frequency range in higher-layer signaling or indicates dynamically the frequency range in physical-layer control signaling; or the user equipment 10 measures the downlink channel in a prescribed fixed frequency range in which there is a pilot transmitted by the network-side apparatus 20 to be used for calibration measurement. Particularly the frequency range can be the entire bandwidth of the system, and at this time the network-side apparatus 20 will not notify the user equipment 10 of any particular frequency range.

2. The network-side apparatus 20 notifies the user equipment 10 of the specific sub-frames for downlink channel measurement:

The network-side apparatus 20 notifies the user equipment 10 of the specific sub-frames, for the downlink channel to be measured, in which there are pilots transmitted by the network-side apparatus 20 for calibration measurement (calibration pilots hereinafter, which can be a Cell-specific Reference Signal (CRS), a Channel State Information-Reference Signal (CSI-RS), a Demodulation-Reference Signal (DM-RS) and other pilots existing in the LTE system). The sub-frames can be determined by a period plus a sub-frame offset.

For example given the period $T_{period}$ and the sub-frame offset $S_{offset}$, there is a calibration pilot in a sub-frame S on the condition of $(S-S_{offset}) \bmod T_{period}=0$; or the calibration measurement sub-frames can alternatively be indicated dynamically in physical-layer signaling.

3. The network-side apparatus 20 notifies the user equipment 10 of the frequency range and the specific sub-frames for downlink channel measurement:

Stated otherwise, 1 and 2 described above are used in combination so that there are calibration pilots in the specific frequency range of the specific sub-frames, and the user equipment 10 estimates the downlink channel in the range.

Figure 3:
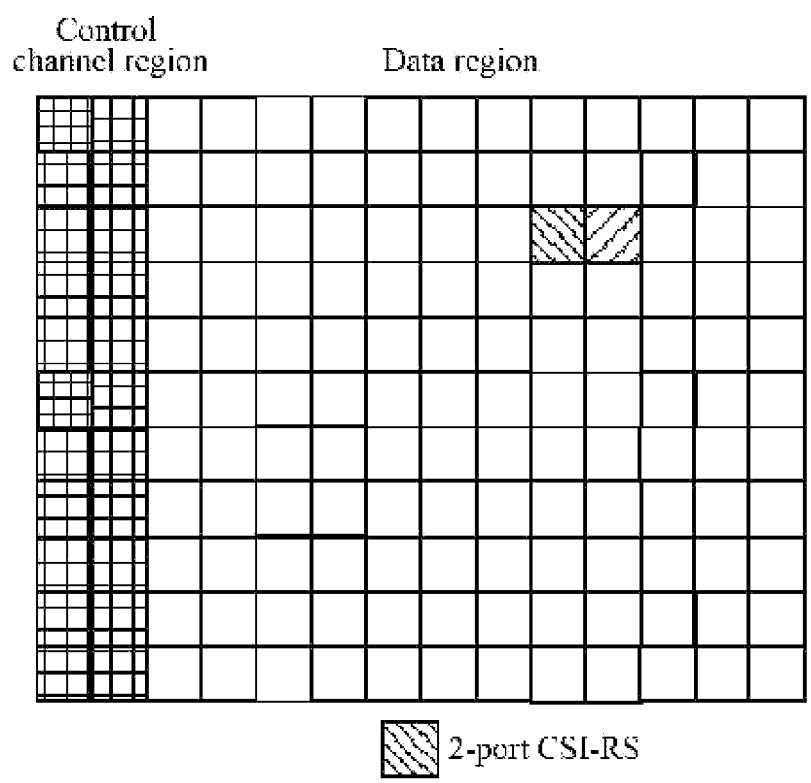
FIG. 3 is a schematic diagram of a first pilot pattern according to an embodiment of the invention.
Figure 4:
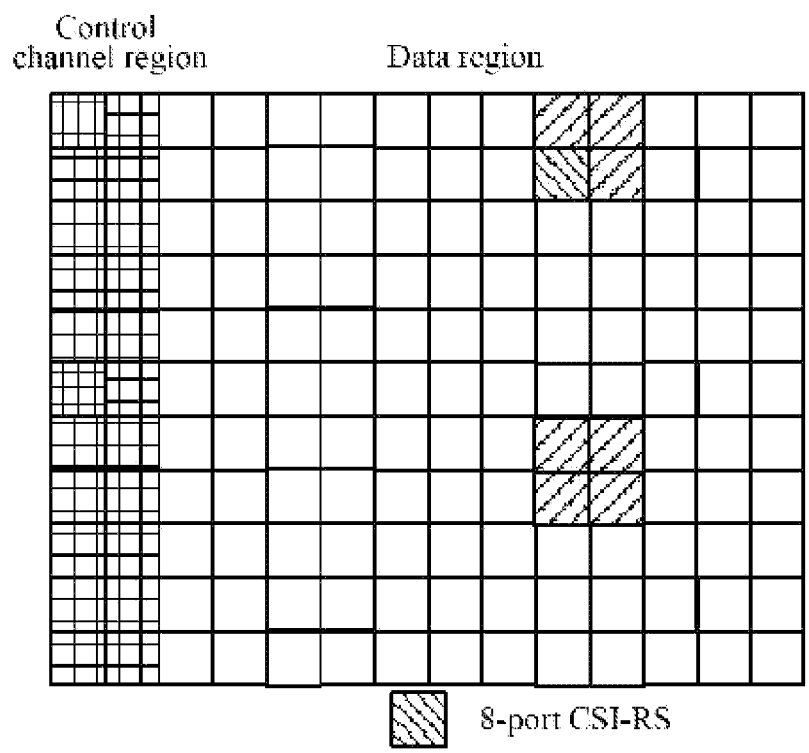
FIG. 4 is a schematic diagram of a second pilot pattern according to an embodiment of the invention.

In an implementation, the network-side apparatus 20 also needs to notify the user equipment 10 of the number of antennas to be calibrated and Resource Elements (REs) occupied in a range of resources for calibration pilots of each of the antennas. i.e., a pattern of calibration pilots. For example, calibration is performed using 2-port or 8-port CSI-RS pilots, where a pattern of 2-port CSI-RS pilots is as illustrated in FIG. 3, and a pattern of 8-port CSI-RS pilots is as illustrated in FIG. 4.

In an implementation, multiple antennas with calibration pilots can be antennas of the same transmission point (e.g., the network-side apparatus 20) or antennas from different network-side apparatuses 20. For example, two antennas can be two antennas of one network-side apparatus 20 or can be antennas respectively from two network-side apparatuses 20. The user equipment 10 can perform measurement without any knowledge of from which of the network-side apparatuses 20 each of the antennas originates.

Figure 5:
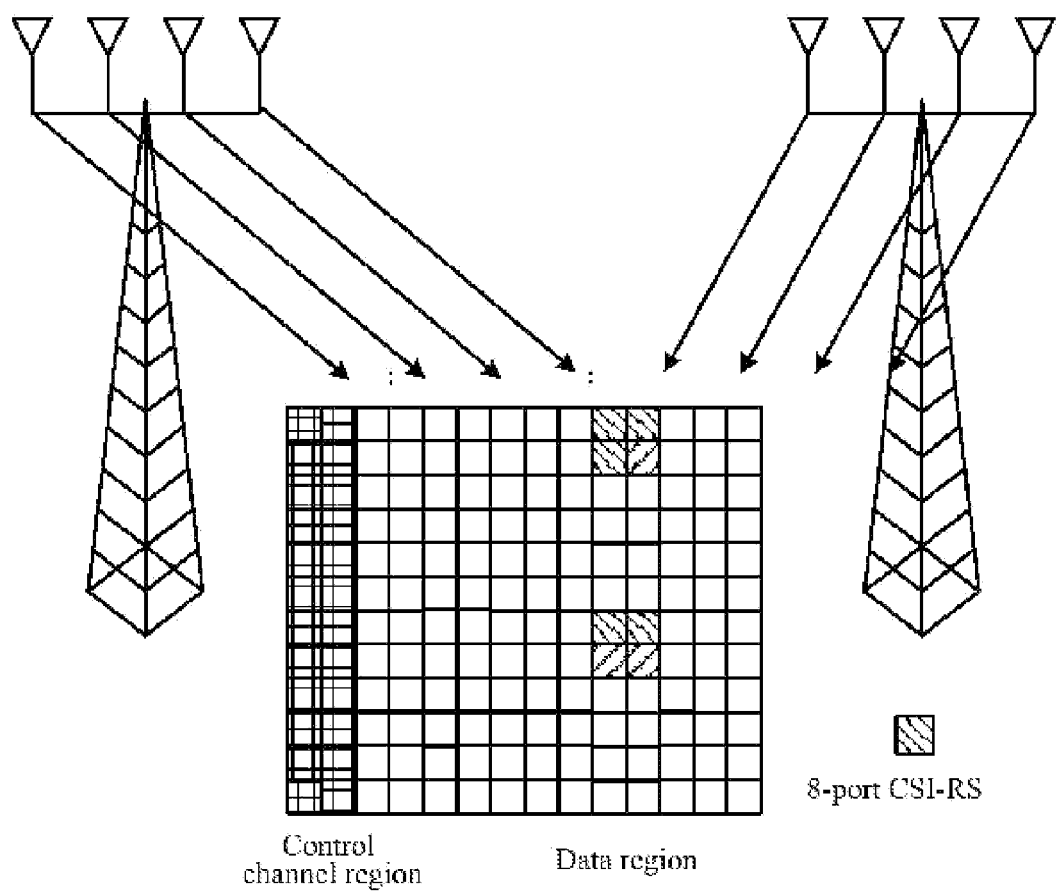
FIG. 5 is a schematic diagram of a first port configuration according to an embodiment of the invention.

In a scenario with calibration between multiple base stations, the number of antennas of each of the network-side apparatuses 20 may be more than one, and the following two processing schemes will be applicable in this case:

In a first processing scheme, each of the antennas at each of the network-side apparatuses is configured with a calibration pilot port, for example, the network-side apparatus A is provided with four antennas while the network-side apparatus B is provided with four antennas, and antenna calibration is performed on the antennas of the network-side apparatus A and the network-side apparatus B, so the user equipment can be configured with calibration pilots of the eight calibration pilot ports, and each of the antennas corresponds to one of the calibration pilot ports of the calibration pilots, as illustrated in FIG. 5.

Figure 6:
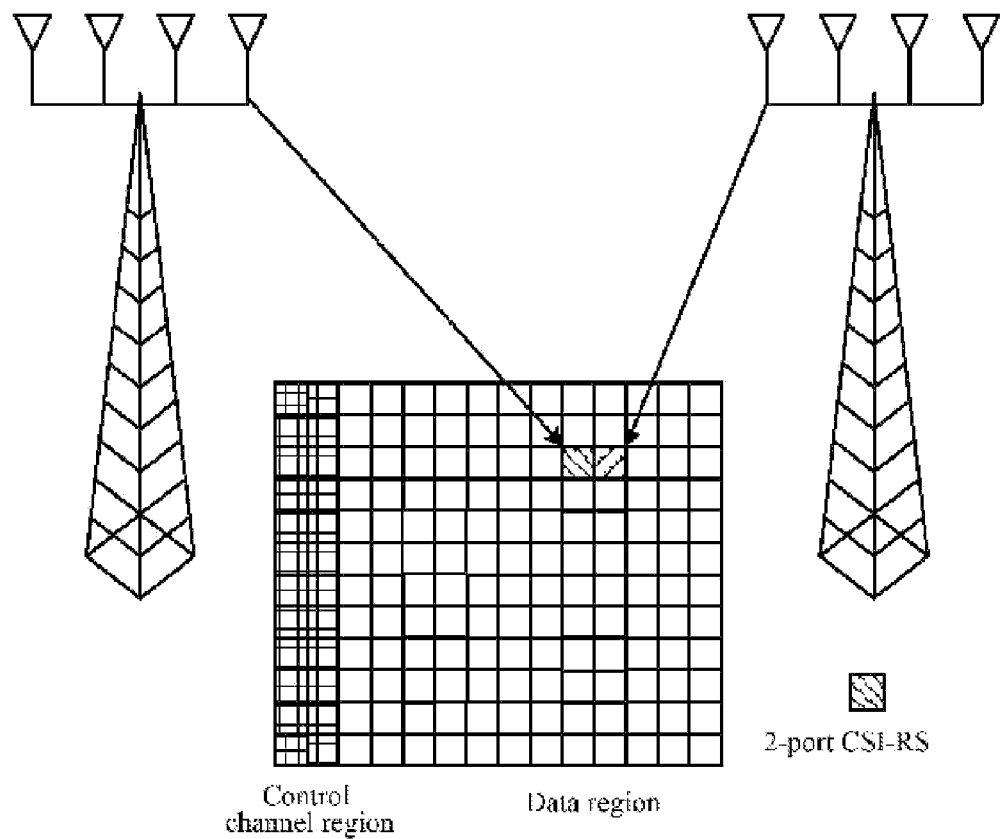
FIG. 6 is a schematic diagram of a second port configuration according to an embodiment of the invention.

In a second processing scheme, it is assumed that the network-side apparatus of each cell has otherwise performed antenna calibration between the respective antennas of the base station to obtain initial calibration coefficients, for example, has obtained the initial calibration coefficients from self-calibration by the network-side apparatus. Each of the base stations selects one of the antennas for participation in an antenna calibration process between the multiple base stations, for example, the network-side apparatus A provided with four antennas selects the first one of them for participation in calibration, the network-side apparatus B provided with four antennas selects the first one of them for participation in calibration, and the network-side apparatus A and the network-side apparatus B have two antennas in total for participation in calibration, so that the user equipment can be configured with calibration pilots of two calibration pilot ports, and the antenna selected by each of the network-side apparatuses corresponds to one of the calibration pilot ports, as illustrated in FIG. 6. This scheme can lower the number of ports of the calibration pilots and consequently a pilot overhead and a feedback overhead.

For the second processing scheme, the network-side apparatus 20 selects one of the multiple antennas for transmission of an uplink pilot signal via the calibration pilot port.

Preferably the user equipment 10 determines the first weight matrix for antenna calibration based on the estimated downlink channel matrix in a number of implementations, several of which will be described below:

The user equipment 10 determines the first weight matrix from the estimated downlink channel matrix of $$H = \begin{bmatrix} H_{11} & H_{12} & \cdot & H_{1N} \\ H_{21} & H_{22} & \cdot & H_{2N} \\ \cdot & \cdot & \cdot & \cdot \\ H_{M1} & H_{M2} & \cdot & H_{MN} \end{bmatrix},$$

where M is the number of receive antennas of the user equipment 10, and N is the number of configured calibration pilot ports.

In a first implementation of determining the first weight matrix, the user equipment 10 performs eigen value decomposition on the downlink channel matrix and determines an eigen value corresponding to the maximum eigen value as the first weight matrix.

Particularly the user equipment 10 performs eigen value decomposition on a correlating matrix $R=H^H H$ of the channel matrix and determines an eigen value corresponding to the maximum eigen value thereof as the first weight matrix denoted by V.

In a second implementation of determining the first weight matrix, the user equipment 10 selects a first weight matrix from a set of first weight matrices according to the downlink channel matrix.

Particularly the user equipment 10 selects the first weight matrix according to the equation of:

$$V = \underset{W_k \in C}{\mathrm{argmax}} \| W_k^H H^H H W_k \|^2;$$

Where V represents the first weight matrix; $C=\{W_1, W_2, \ldots W_L\}$ represents the set of first weight matrices; L represents the number of elements in the set of first weight matrices; and H represents the downlink channel matrix.

Preferably the number of dimensions of each of the first weight matrices in the set of first weight matrices is N×1, where N is the number of calibration pilot ports, i.e., $V=[v_1, v_2, \bullet, v_N]^T$ in N rows by 1 column, and this number of dimensions will apply throughout the following description although another number of dimension can also be applicable with the embodiment of the invention, so a repeated description thereof will be omitted here.

For the first implementation of determining the first weight matrix, the user equipment 10 quantizes and then reports respective elements in the first weight matrix.

For the second implementation of determining the first weight matrix, the user equipment 10 determines the identifier corresponding to the selected first weight matrix in the set of first weight matrices and reports the determined identifier.

Where, the first weight matrix is calculated and fed back for a specific bandwidth, for example, the bandwidth of the system is divided into several sub-bands, for each of which one first weight matrix is calculated and fed back.

In an implementation, the user equipment 10 transmits an uplink pilot signal over a resource specified by the network-side apparatus 20 for uplink channel estimation by the network-side apparatus 20.

Preferably the network-side apparatus 20 notifies the user equipment of a frequency range and/or a specific sub-frame for transmission of the uplink pilot signal; and correspondingly the user equipment 10 transmits the uplink pilot signal in the frequency range notified of by the network-side and/or the specific sub-frame notified of by the network-side.

The network-side apparatus 20 calculates the uplink channel matrix from the uplink pilot signal transmitted by the user equipment as $$G_{UL} = \begin{bmatrix} G_{11} & G_{12} & \cdot & G_{1R} \\ G_{21} & G_{22} & \cdot & G_{2R} \\ \cdot & \cdot & \cdot & \cdot \\ G_{N1} & G_{N2} & \cdot & G_{NR} \end{bmatrix},$$

where receive antennas of the uplink channel matrix are transmit antennas of the calibration pilots, and R represents the number of antennas over which the user equipment transmits the uplink pilot signal. Preferably R can be equal to M, that is, the user equipment transmits the uplink pilot signal over all the antennas over which a downlink calibration pilot is received. Preferably R can alternatively be smaller than M, that is, the user equipment transmits the uplink pilot signal over a part of the antennas over which a downlink calibration pilot is received. The uplink pilot signal transmitted by the user equipment can be a Sounding Reference Signal (SRS) or can be a Demodulation Reference Signal (DMRS).

The network-side apparatus 20 calculates calibration coefficients of N antennas and can calculate the calibration coefficients by solving the following optimization problem:

$$D = \underset{D_s}{\mathrm{argmax}} \| G_{UL}^T D_s V \|^2;$$

Where $$D = \begin{bmatrix} d_1 & 0 & \cdot & 0 \\ 0 & d_2 & 0 & 0 \\ \cdot & 0 & \cdot & \cdot \\ 0 & 0 & \cdot & d_N \end{bmatrix}$$

with $d_k$ being the calibration coefficient of the antenna corresponding to the k-th calibration pilot port.

Preferably if the network-side apparatus 20 receives one first weight matrix, then the network-side apparatus 20 can determine the calibration coefficients in Equation 1 by modifying the foregoing optimization problem:

$$E = \underset{F}{\mathrm{argmax}} \| G_{UL}^T \mathrm{diag}(V) F \|^2; \qquad \text{Equation 1}$$

Where $E=[e_1, e_2, \bullet, e_N]^T$ represents the determined calibration coefficient; $G_{UL}^T$ represents the transposed uplink channel matrix; $V=[v_1, v_2, \bullet, v_N]^T$ represents the first weight matrix; $F=[f_1, f_2, \bullet, f_N]^T$ represents functional variables;

$$\text{diag}(V) = \begin{bmatrix} v_1 & 0 & \cdot & 0 \\ 0 & v_2 & 0 & 0 \\ \cdot & 0 & \cdot & \cdot \\ 0 & 0 & \cdot & v_N \end{bmatrix}$$

represents a diagonal matrix built from the first weight matrix; and N represents the number of calibration pilot ports.

Furthermore $e_k$ represents the calibration coefficient of the antenna corresponding to the k-th calibration pilot port. As can be readily apparent, Equation 1 is solved as an eigen vector corresponding to the maximum eigen value of the matrix $(G_{UL}^T\text{diag}(V))^H G_{UL}^T\text{diag}(V)$ i.e., $E=\text{eigvec}((G_{UL}^T\text{diag}(V))^H G_{UL}^T\text{diag}(V))$, where eigvec(A) represents an eigen vector corresponding to the maximum eigen value of a matrix A.

Preferably if the network-side apparatus 20 receives multiple first weight matrices, for example, the network-side apparatus 20 obtains Q sets of data values, each of which includes the uplink channel $G_{UL,q}$ and the first weight matrix $V_q$ fed back by the corresponding user equipment 10, where $G_{UL,q}$ and $V_q$ in the same set of data correspond to the same user equipment 10, as long as the length of time between the time when $G_{UL,q}$ is obtained by the network-side apparatus 20 and the time when $V_q$ is obtained by the user equipment 10 is not above a threshold and they correspond to the same frequency band.

The Q sets of data values can be measured and reported by one user equipment 10 more than once or can be measured and reported by different user equipments 10. From the optimization problem of calibration coefficients as a result of joint optimization of the Q sets of data values, the network-side apparatus 20 can determine the calibration coefficients in Equation 2 of:

$$E = \underset{F}{\text{argmax}} \frac{1}{Q}\sum_{q=1}^{Q} \|G_{UL,q}^T \text{diag}(V_q) F\|^2; \quad \text{Equation 2}$$

Where $E=[e_1, e_2, \bullet, e_N]^T$ represents the determined calibration coefficients; $G_{UL,q}$ represents the transposed uplink channel matrix corresponding to $V_q$; $V_q=[v_{q1}, v_{q2}, \bullet, v_{qN}]^T$ represents the first weight matrices; Q represents the number of received first weight matrices; $F=[f_1, f_2, \bullet, f_N]^T$ represents functional variables; and $$\text{diag}(V_q) = \begin{bmatrix} v_{q1} & 0 & \bullet & 0 \\ 0 & v_{q2} & 0 & 0 \\ \bullet & 0 & \bullet & \bullet \\ 0 & 0 & \bullet & v_{qN} \end{bmatrix}$$

represents diagonal matrix built from the first weight matrix.

Where the optimization problem in Equation 2 can be solved as $$E = \text{eigvec}\left(\frac{1}{Q}\sum_{q=1}^{Q} (G_{UL,q}^T \text{diag}(V_q))^H G_{UL,q}^T \text{diag}(V_q)\right).$$

In addition to the implementations described above of determining the calibration coefficients in Equation 1 and Equation 2, the network-side apparatus 20 according to the embodiment of the invention can determine the calibration coefficients in the following implementations:

Particularly the network-side apparatus 20 determines a second weight matrix from the uplink channel matrix and determines the calibration coefficients from the first weight matrix and the second weight matrix.

Preferably the network-side apparatus 20 can determine the first weight matrix in a number of implementations, several of which will be described below:

In a first implementation of determining the first weight matrix, the network-side apparatus 20 determines the first weight matrix based on a set of first weight matrices by the received identifier of the first weight matrix reported by the user equipment.

In a second implementation of determining the first weight matrix, the network-side apparatus 20 determines the first weight matrix based on the received elements, in the first weight matrix, reported by the user equipment 10.

Preferably the network-side apparatus 20 can determine the second weight matrix in a number of implementations, several of which will be described below:

In a first implementation of determining the second weight matrix, the network-side apparatus 20 performs eigen value decomposition on the uplink channel matrix and determines an eigen vector corresponding to the maximum eigen value as the second weight matrix.

In a second implementation of determining the second weight matrix, the network-side apparatus 20 selects a second weight matrix from a set of second weight matrices according to the uplink channel matrix.

Particularly the network-side apparatus 20 selects the second weight matrix in the equation of:

$$Z = \underset{W_k \in C_2}{\text{argmax}} \|W_k^H (G_{UL}^T)^H G_{UL}^T W_k\|^2;$$

Where Z represents the second weight matrix; $C_2=\{W_1, W_2, \ldots, W_L\}$ represents the set of second weight matrices; L represents the number of elements in the set of second weight matrices; and $G_{UL}^T$ represents the uplink channel matrix.

Preferably the number of dimensions of each of the second weight matrices in the set of second weight matrices is N×1, where N represents the number of calibration pilot ports.

Preferably for an antenna, the network-side apparatus 20 divides an element in the second weight matrix corresponding to the antenna by an element in the first weight matrix corresponding to the antenna as a calibration coefficient corresponding to the antenna.

Particularly if the second weight matrix is $Z=[z_1, z_2, \bullet, z_N]^T$, then a calibration coefficient of the k-th antenna can be calculated as In an implementation, if the network-side apparatus 20 obtains Q sets of data (which are similar to the Q sets of data described above, so a repeated description thereof will be omitted here), then the network-side apparatus 20 can calculate a vector of calibration coefficients $E_q=[e_1, e_2, \ldots, e_{qN}]^T$ from each of the sets of data and integrate the vectors of calibration coefficients from the multiple sets of data into more stable and reliable calibration coefficients with a lower error.

Particularly if the network-side apparatus receives multiple first weight matrices, then the network-side apparatus determines a calibration coefficient from each of the first weight matrices.

The network-side apparatus weights and averages the calibration coefficients into resulting calibration coefficients, i.e., $$E = \frac{1}{Q}\sum_{q=1}^{Q} E_q/e_{q1},$$

where $E_q/e_{q1}$ functions to set a first element of each vector of calibration coefficients at 1 without any influence upon the function of the vector of calibration coefficients to thereby making a result of the averaging operation more reasonable; or With a primary-component analysis, the network-side apparatus determines eigen vectors corresponding to the maximum eigen values of the matrices in Equation 3 as resulting calibration coefficients:

$$\frac{1}{Q}\sum_{q=1}^{Q} E_q E_q^H; \quad \text{Equation 3}$$

Where Q is the number of received first weight matrices; and $E_q=[e_{q1}, e_{q2}, \ldots, e_{qN}]^T$ represents the vectors of calibration coefficients determined from the first weight matrices.

Preferably for joint calibration between multiple base stations, multiple antennas configured with one calibration pilot port, then the calibration coefficients calculated above (including the calibration coefficients derived in Equation 1 and Equation 2 and the calibration coefficients determined from the first weight matrices and the second weight matrices) may be the calibration coefficients representing representative antennas thereof and need to be further processed to achieve all calibration coefficients of the respective antennas thereof.

Particularly if multiple antennas are configured with one calibration pilot port and the network-side apparatus 20 has obtained initial calibration coefficients between the multiple antennas, then for the calibration pilot port, the network-side apparatus 20 determines actual calibration coefficients of the respective antennas corresponding to the calibration pilot port from the initial calibration coefficients of the respective antennas and calibration coefficients determined by the calibration pilot.

A base station is assumed to be provided with S antennas, and calibration coefficients of the respective antennas are derived otherwise, e.g., from self-calibration, as $R=[r_1, r_2, \bullet, r_S]^T$, where $r_k$ represents a calibration coefficient corresponding to the k-th antenna. Given a calibration coefficient of a representative antenna (a first antenna) calculated as "a" in the embodiment of this method, the network-side apparatus 20 can calculate resulting calibration coefficients of antennas as $aR=[a \cdot r_1, a \cdot r_2, \bullet, a \cdot r_S]^T$.

Antenna calibration can be performed between base stations in the embodiments of the invention to thereby improve the performance of the system when the reciprocity of uplink and downlink channels in the system does not hold; and with an application to the TDD system, the TDD system can obtain downlink joint channels of the multiple base stations based upon a measured uplink channel when the channel reciprocity does not hold in the system to thereby improve the performance of coordinated multipoint transmission/reception so as to make full use of the advantage of TDD.

Where the network-side apparatus according to the embodiment of the invention can be a base station (e.g., a macro Node B, a home Node B, etc.) or can be a Relay Node (RN) or can be another network-side apparatus.

Based upon the same inventive idea, embodiments of the invention further provide a user equipment, a network-side apparatus, a method of reporting by a user equipment a first weight matrix and a method of antenna calibration by a network-side apparatus, and since these apparatus, equipment and methods address the problem under a similar principle to the antenna calibration system according to the embodiment of the invention, reference can be made to the implementation of the system for implementations of these apparatuses and methods, so a repeated description thereof will be omitted here.

Figure 7:
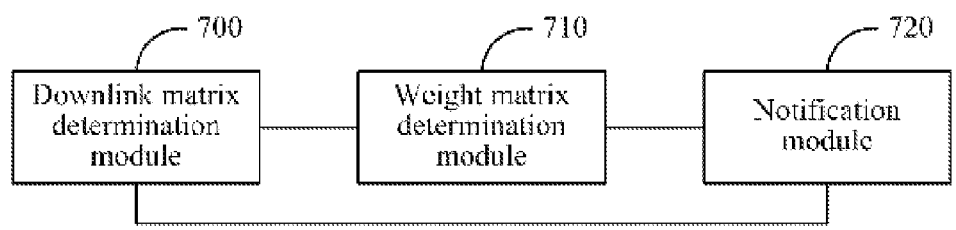
FIG. 7 is a schematic structural diagram of a user equipment in an antenna calibration system according to an embodiment of the invention.

As illustrated in FIG. 7, a user equipment in an antenna calibration system according to an embodiment of the invention includes a downlink matrix determination module 700, a weight matrix determination module 710 and a notification module 720.

The downlink matrix determination module 700 is configured to perform downlink channel measurement and to determine a downlink channel matrix;

The weight matrix determination module 710 is configured to determine a first weight matrix for antenna calibration based on the downlink channel matrix; and The notification module 720 is configured to notify the network side of the determined first weight matrix.

Preferably the weight matrix determination module 710 is further configured to perform eigen value decomposition on the downlink channel matrix and to determine an eigen vector corresponding to the maximum eigen value as the first weight matrix.

Correspondingly the notification module 720 is further configured to quantify and then report respective elements in the first weight matrix.

Preferably the weight matrix determination module 710 is further configured to select a first weight matrix from a set of first weight matrices according to the downlink channel matrix; and Correspondingly the notification module 720 is further configured to determine the identifier corresponding to the selected first weight matrix in the set of first weight matrices and to report the determined identifier.

Preferably the downlink matrix determination module 700 is further configured to perform downlink channel measurement based on a frequency range notified of by the network side and/or specific sub-frames notified of by the network side.

Preferably downlink matrix determination module 700 is further configured to transmit an uplink pilot signal based on a frequency range notified of by the network side and/or specific sub-frames notified of by the network side.

Figure 8:
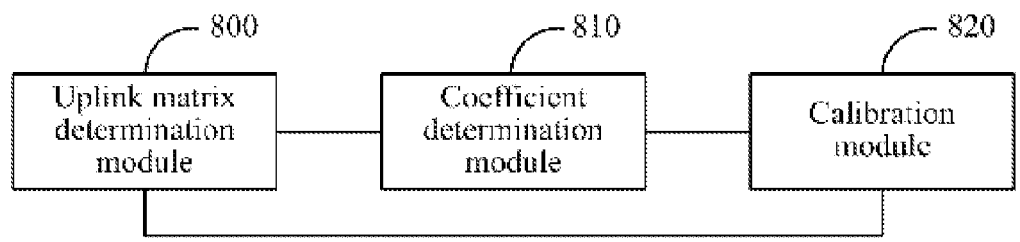
FIG. 8 is a schematic structural diagram of a network-side apparatus in an antenna calibration system according to an embodiment of the invention.

As illustrated in FIG. 8, a network-side apparatus in an antenna calibration system according to an embodiment of the invention includes an uplink matrix determination module 800, a coefficient determination module 810 and a calibration module 820.

The uplink matrix determination module 800 is configured to perform uplink channel measurement and to determine an uplink channel matrix;

The coefficient determination module 810 is configured to determine calibration coefficients based on the uplink channel matrix and a received first weight matrix from a user equipment; and The calibration module 820 is configured to perform antenna calibration based on the determined calibration coefficients.

Preferably if the coefficient determination module 810 receives one first weight matrix, then the coefficient determination module 810 is further configured to determine the calibration coefficients in Equation 1.

Preferably if the coefficient determination module 810 receives multiple first weight matrices, then the coefficient determination module 810 is further configured to determine the calibration coefficients in Equation 2.

Preferably the coefficient determination module 810 is further configured to determine a second weight matrix from the uplink channel matrix and to determine the calibration coefficients from the first weight matrix and the second weight matrix.

Preferably the coefficient determination module 810 is further configured to determine the first weight matrix from the set of first weight matrices according to received identifier, of the first weight matrix, reported by the user equipment 10; or to determine the first weight matrix from respective received elements, in the first weight matrix, reported by the user equipment 10.

Preferably the coefficient determination module 810 is further configured to perform eigen value decomposition on the uplink channel matrix and to determine an eigen vector corresponding to the maximum eigen value as the second weight matrix; or to select a second weight matrix from a set of second weight matrices according to the uplink channel matrix.

Preferably for an antenna, the coefficient determination module 810 is further configured to divide an element in the second weight matrix corresponding to the antenna by an element in the first weight matrix corresponding to the antenna as a calibration coefficient corresponding to the antenna.

Preferably if the network-side apparatus receives multiple first weight matrices, then the coefficient determination module 810 is further configured to determine a calibration coefficient from each of the first weight matrices and to average calibration coefficients into resulting calibration coefficients; or to determine eigen vectors corresponding to the maximum eigen values of the matrices in Equation 3 as resulting calibration coefficients.

Preferably multiple antennas of the network-side apparatus are configured with one calibration pilot port; or each of the antennas of the network-side apparatus is configured with one calibration pilot port.

Preferably if the multiple antennas of the network-side apparatus are configured with a calibration pilot port, then the uplink matrix determination module 800 is further configured to select one of the multiple antennas for transmission of a pilot signal via the calibration pilot port.

Preferably if the multiple antennas are configured with one calibration pilot port and the coefficient determination module 810 has obtained initial calibration coefficients between the multiple antennas, then for a calibration pilot port, the coefficient determination module 810 is further configured to determine actual calibration coefficients of the respective antennas corresponding to the calibration pilot port from the initial calibration coefficients of the respective antennas and calibration coefficients determined by the calibration pilot.

Preferably the uplink matrix determination module 800 is further configured to notify the user equipment of a frequency range and/or specific sub-frames for downlink channel measurement.

Preferably the uplink matrix determination module 800 is further configured to notify the user equipment of a frequency range and/or specific sub-frames for transmission of an uplink pilot signal.

Figure 9:
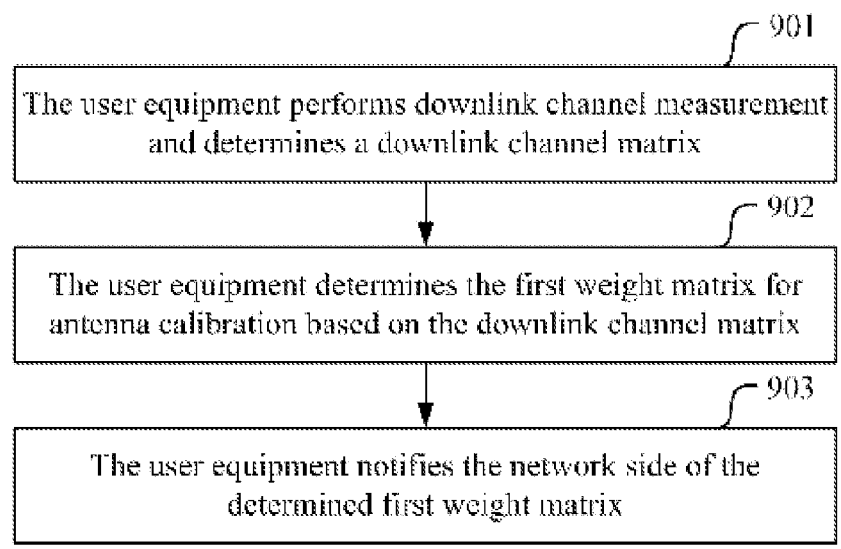
FIG. 9 is a schematic flow chart of a method of reporting by a user equipment a weight matrix according to an embodiment of the invention.

As illustrated in FIG. 9, a method of reporting a first weight matrix by a user equipment according to an embodiment of the invention includes the following steps:

In the step 901, the user equipment performs downlink channel measurement and determines a downlink channel matrix;

In the step 902, the user equipment determines the first weight matrix for antenna calibration based on the downlink channel matrix; and In the step 903, the user equipment notifies the network side of the determined first weight matrix.

Preferably in the step 901, the user equipment performs downlink channel measurement based on a frequency range notified of by the network side and/or specific sub-frames notified of by the network side.

Preferably in the step 902, the user equipment performs eigen value decomposition on the downlink channel matrix and determines an eigen vector corresponding to the maximum eigen value as the first weight matrix; and Correspondingly in the step 903, the user equipment quantifies and then reports respective elements in the first weight matrix.

Preferably in the step 902, the user equipment selects a first weight matrix from a set of first weight matrices according to the downlink channel matrix.

Preferably the number of dimensions of each of the first weight matrices in the first set of first weight matrices is N×1; where N represents the number of antennas to be calibrated.

Preferably in the step 902, the user equipment determines the identifier corresponding to the selected first weight matrix in the set of first weight matrices and reports the determined identifier.

Preferably the user equipment performs downlink channel measurement based on a frequency range notified of by the network side and/or specific sub-frames notified of by the network side.

Preferably the user equipment transmits an uplink pilot signal based on a frequency range notified of by the network side and/or specific sub-frames notified of by the network side.

Figure 10:
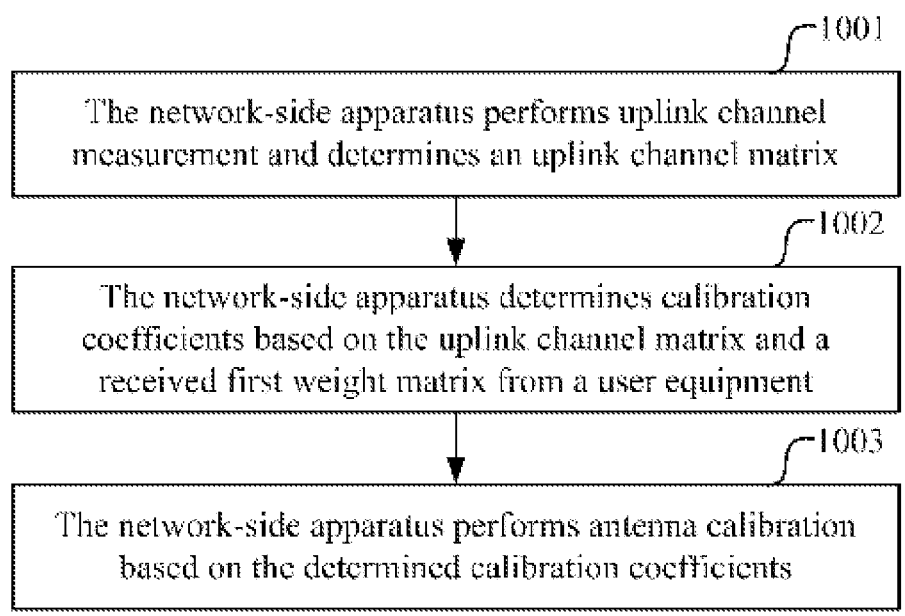
FIG. 10 is a schematic flow chart of a method of antenna calibration by a network-side apparatus according to an embodiment of the invention.

As illustrated in FIG. 10, a method of antenna calibration by a network-side apparatus according to an embodiment of the invention includes the following steps:

In the step 1001, the network-side apparatus performs uplink channel measurement and determines an uplink channel matrix;

In the step 1002, the network-side apparatus determines calibration coefficients based on the uplink channel matrix and a received first weight matrix from a user equipment; and In the step 1003, the network-side apparatus performs antenna calibration based on the determined calibration coefficients.

Preferably if the network-side apparatus receives one first weight matrix, then in the step 1002, the network-side apparatus determines the calibration coefficients in Equation 1.

Preferably if the network-side apparatus receives multiple first weight matrices, then in the step 1002, the network-side apparatus determines the calibration coefficients in Equation 2.

In addition to the determination described above of the calibration coefficients in Equation 1 and in Equation 2, the network-side apparatus according to the embodiment of the invention can further determine otherwise the calibration coefficients:

Particularly in the step 1002, the network-side apparatus determines a second weight matrix from the uplink channel matrix and determine the calibration coefficients from the first weight matrix and the second weight matrix.

Preferably the network-side apparatus determining the second weight matrix includes:

The network-side apparatus performs eigen value decomposition on the uplink channel matrix and determines an eigen vector corresponding to the maximum eigen value as the second weight matrix; or The network-side apparatus selects a second weight matrix from a set of second weight matrices according to the uplink channel matrix.

Preferably the number of dimensions of each of the second weight matrices in the set of second weight matrices is N×1;

Where N represents the number of antennas to be calibrated.

Preferably for an antenna, the network-side apparatus divides an element in the second weight matrix corresponding to the antenna by an element in the first weight matrix corresponding to the antenna as a calibration coefficient corresponding to the antenna.

Preferably if the network-side apparatus receives multiple first weight matrices, then the network-side apparatus determines a calibration coefficient from each of the first weight matrices and averages the calibration coefficients into resulting calibration coefficients; or determines eigen vectors corresponding to the maximum eigen values of the matrices in Equation 3 as resulting calibration coefficients.

Preferably multiple antennas of the network-side apparatus are configured with one calibration pilot port; or each of the antennas of the network-side apparatus is configured with one calibration pilot port.

Preferably if the multiple antennas of the network-side apparatus are configured with one calibration pilot port, then the network-side apparatus selects one of the multiple antennas for transmission of a pilot signal via the calibration pilot port.

Preferably if the multiple antennas are configured with one calibration pilot port and the network-side apparatus has obtained initial calibration coefficients between the multiple antennas, then for a calibration pilot port, the network-side apparatus determines real calibration coefficients of the respective antennas corresponding to the calibration pilot port from the initial calibration coefficients of the respective antennas and calibration coefficients determined by the calibration pilot after determining the calibration coefficients and before performing antenna calibration.

Preferably the network-side apparatus notifies the user equipment of a frequency range and/or specific sub-frames for downlink channel measurement.

Preferably the network-side apparatus notifies the user equipment of a frequency range and/or specific sub-frames for transmission of an uplink pilot signal.

Where that FIG. 9 and FIG. 10 can be integrated into a flow of a method of antenna calibration, where firstly the steps 901 to 903 and then the steps 1001 to 1003 are performed.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An antenna calibration method, wherein the method comprises:

a user equipment performing downlink channel measurement and determining a downlink channel matrix;

the user equipment determining a first weight matrix for antenna calibration based on the downlink channel matrix; and the user equipment notifying the network side of the determined first weight matrix;

wherein the network-side apparatus receives one first weight matrix; and the network-side apparatus determines the calibration coefficients by the equation of:

$$E = \underset{F}{\mathrm{argmax}} \|G_{UL}^T \mathrm{diag}(V)F\|^2;$$

wherein E represents the determined calibration coefficients; $G_{UL}^T$ represents the transposed uplink channel matrix; $V=[v_1, v_2, \ldots, v_N]^T$ represents the first weight matrices; $F=[f_1, f_2, \ldots, f_N]^T$ represents functional variables; and $$\mathrm{diag}(V) = \begin{bmatrix} v_1 & 0 & \cdots & 0 \\ 0 & v_2 & 0 & 0 \\ \vdots & 0 & \ddots & \vdots \\ 0 & 0 & \cdots & v_N \end{bmatrix}$$

represents a diagonal matrix built from the first weight matrix; N represents the number of calibration pilot ports; or the network-side apparatus receives multiple first weight matrices; and the network-side apparatus determines the calibration coefficients in the equation of:

$$E = \underset{F}{\mathrm{argmax}} \frac{1}{Q} \sum_{q=1}^{Q} \|G_{UL,q}^T \mathrm{diag}(V_q)F\|^2;$$

wherein E represents the determined calibration coefficient; $G_{UL,q}^T$ represents the transposed uplink channel matrix corresponding to $V_q$; $V_q=[v_{q1}, v_{q2}, \ldots, v_{qN}]^T$ represents the first weight matrices; Q represents the number of received first weight matrices; $F=[f_1, f_2, \ldots, f_N]^T$ represents functional variables; and $$\mathrm{diag}(V_q) = \begin{bmatrix} v_{q1} & 0 & \cdots & 0 \\ 0 & v_{q2} & 0 & 0 \\ \vdots & 0 & \ddots & \vdots \\ 0 & 0 & \cdots & v_{qN} \end{bmatrix}$$

represents diagonal matrices built from the first weight matrices.

2. The method of claim 1, wherein the user equipment determining the first weight matrix comprises:
the user equipment performing eigen value decomposition on the downlink channel matrix and determining an eigen vector corresponding to the maximum eigen value as the first weight matrix; and
the user equipment notifying the network side of the determined first weight matrix comprises:
the user equipment quantizing and then reporting respective elements in the first weight matrix.

3. The method of claim 1, wherein the user equipment determining the first weight matrix comprises:
the user equipment selecting a first weight matrix from a set of first weight matrices according to the downlink channel matrix.

4. The method of claim 3, wherein the user equipment notifying the network side of the determined first weight matrix comprises:
the user equipment determining the identifier corresponding to the selected first weight matrix in the set of first weight matrices and reporting the determined identifier.

5. The method of claim 1, wherein the user equipment performing downlink channel measurement comprises:
the user equipment performing downlink channel measurement based on a frequency range notified by the network side and/or specific sub-frames notified by the network side.

6. The method according to claim 1, wherein the method further comprises:
the user equipment transmitting an uplink pilot signal based on a frequency range notified by the network side and/or specific sub-frames notified by the network side.

7. An antenna calibration method, wherein the method comprises:
a network-side apparatus performing uplink channel measurement and determining an uplink channel matrix;
the network-side apparatus determining calibration coefficients based on the uplink channel matrix and a received first weight matrix from a user equipment; and
the network-side apparatus performing antenna calibration based on the determined calibration coefficients;
wherein the network-side apparatus receives one first weight matrix; and the network-side apparatus determines the calibration coefficients by the equation of:

$$E = \underset{F}{\mathrm{argmax}} \|G_{UL}^T \mathrm{diag}(V)F\|^2;$$

wherein E represents the determined calibration coefficients; $G_{UL}^T$ represents the transposed uplink channel matrix; $V=[v_1, v_2, \ldots, v_N]^T$ represents the first weight matrices; $F=[f_1, f_2, \ldots, f_N]^T$ represents functional variables; and $$\mathrm{diag}(V) = \begin{bmatrix} v_1 & 0 & \cdots & 0 \\ 0 & v_2 & 0 & 0 \\ \vdots & 0 & \ddots & \vdots \\ 0 & 0 & \cdots & v_N \end{bmatrix}$$

represents a diagonal matrix built from the first weight matrix; N represents the number of calibration pilot ports; or the network-side apparatus receives multiple first weight matrices; and the network-side apparatus determines the calibration coefficients in the equation of:

$$E = \underset{F}{\mathrm{argmax}} \frac{1}{Q} \sum_{q=1}^{Q} \|G_{UL,q}^T \mathrm{diag}(V_q)F\|^2;$$

wherein E represents the determined calibration coefficient; $G_{UL,q}^T$ represents the transposed uplink channel matrix corresponding to $V_q$; $V_q=[v_{q1}, v_{q2}, \ldots, v_{qN}]^T$ represents the first weight matrices; Q represents the number of received first weight matrices; $F=[f_1, f_2, \ldots, f_N]^T$ represents functional variables; and $$\text{diag}(V_q) = \begin{bmatrix} v_{q1} & 0 & \cdots & 0 \\ 0 & v_{q2} & 0 & 0 \\ \vdots & 0 & \ddots & \vdots \\ 0 & 0 & \cdots & v_{qN} \end{bmatrix}$$

represents diagonal matrices built from the first weight matrices.

8. The method of claim 7, wherein the received first weight matrix is determined by the network-side apparatus from a set of first weight matrices according to the received identifier, of the first weight matrix, reported by the user equipment.

9. The method of claim 7, wherein the received first weight matrix is determined by the network-side apparatus according to respective received elements, in the first weight matrix, reported by the user equipment.

10. The method of claim 7, wherein the network-side apparatus determining the calibration coefficients comprises:
the network-side apparatus determining a second weight matrix from the uplink channel matrix; and
the network-side apparatus determining the calibration coefficients from the first weight matrix and the second weight matrix.

11. The method of claim 10, wherein the network-side apparatus determining the second weight matrix comprises:
the network-side apparatus performing eigen value decomposition on the uplink channel matrix and determining an eigen vector corresponding to the maximum eigen value as the second weight matrix; or
the network-side apparatus selecting a second weight matrix from a set of second weight matrices according to the uplink channel matrix.

12. The method of claim 10, wherein the network-side apparatus determining the calibration coefficients comprises:
for an antenna, the network-side apparatus dividing an element in the second weight matrix corresponding to the antenna by an element in the first weight matrix corresponding to the antenna as a calibration coefficient corresponding to the antenna.

13. The method of claim 10, wherein the network-side apparatus determining the calibration coefficients comprises:
if the network-side apparatus receives multiple first weight matrices, then the network-side apparatus determining a calibration coefficient from each of the first weight matrices; and
the network-side apparatus averaging calibration coefficients into resulting calibration coefficients or determining eigen vectors corresponding to the maximum eigen values of the matrix in the following equation as resulting calibration coefficients:

$$\frac{1}{Q}\sum_{q=1}^{Q} E_q E_q^H;$$

Wherein Q is the number of received first weight matrices; and $E_q=[e_{q1}, e_{q2}, \ldots, e_{qN}]^T$ represents the calibration coefficients determined from the first weight matrices.

14. An antenna calibration network-side apparatus, wherein the network-side apparatus comprises:
an uplink matrix determination module configured to perform uplink channel measurement and to determine an uplink channel matrix;
a coefficient determination module configured to determine calibration coefficients based on the uplink channel matrix and a received first weight matrix from a user equipment; and
a calibration module configured to perform antenna calibration based on the determined calibration coefficients;
wherein if one first weight matrix is received, then the coefficient determination module is further configured to determine the calibration coefficients in the equation of:

$$E = \underset{F}{\text{argmax}} \|G_{UL}^T \text{diag}(V) F\|^2;$$

wherein E represents the determined calibration coefficients; $G_{UL}^T$ represents the transposed uplink channel matrix; $V=[v_1, v_2, \ldots, v_N]^T$ represents the first weight matrices; $F=[f_1, f_2, \ldots, f_N]^T$ represents functional variables; and $$\text{diag}(V) = \begin{bmatrix} v_1 & 0 & \cdots & 0 \\ 0 & v_2 & 0 & 0 \\ \vdots & 0 & \ddots & \vdots \\ 0 & 0 & \cdots & v_N \end{bmatrix}$$

represents a diagonal matrix built from the first weight matrix; N represents the number of calibration pilot ports; or
if multiple first weight matrices are received, then the coefficient determination module is further configured to determine the calibration coefficients in the equation of:

$$E = \underset{F}{\text{argmax}} \frac{1}{Q} \sum_{q=1}^{Q} \|G_{UL,q}^T \text{diag}(V_q) F\|^2;$$

wherein E represents the determined calibration coefficient; $G_{UL,q}^T$ represents the transposed uplink channel matrix corresponding to $V_q$; $V_q=[v_{q1}, v_{q2}, \ldots, v_{qN}]^T$ represents the first weight matrices; Q represents the number of received first weight matrices; $F=[f_1, f_2, \ldots, f_N]^T$ represents functional variables; and $$\text{diag}(V_q) = \begin{bmatrix} v_{q1} & 0 & \cdots & 0 \\ 0 & v_{q2} & 0 & 0 \\ \vdots & 0 & \ddots & \vdots \\ 0 & 0 & \cdots & v_{qN} \end{bmatrix}$$

represents diagonal matrices built from the first weight matrices; N represents the number of calibration pilot ports.

15. The network-side apparatus of claim 14, wherein the received first weight matrix is determined by the coefficient determination module from a set of first weight matrices according to the received identifier, of the first weight matrix, reported by the user equipment.

16. The network-side apparatus of claim 14, wherein the received first weight matrix is determined by the coefficient determination module according to respective received elements, in the first weight matrix, reported by the user equipment.

17. The network-side apparatus of claim 14, wherein the coefficient determination module is further configured:
to determine a second weight matrix from the uplink channel matrix and to determine the calibration coefficients from the first weight matrix and the second weight matrix.

18. The network-side apparatus of claim 17, wherein the coefficient determination module is further configured:
to perform eigen value decomposition on the uplink channel matrix and to determine an eigen vector corresponding to the maximum eigen value as the second weight matrix; or to select a second weight matrix from a set of second weight matrices according to the uplink channel matrix.

19. The network-side apparatus of claim 17, wherein the coefficient determination module is further configured:
for an antenna, to divide an element in the second weight matrix corresponding to the antenna by an element in the first weight matrix corresponding to the antenna as a calibration coefficient corresponding to the antenna.

20. The network-side apparatus of claim 17, wherein the coefficient determination module is further configured:
if the network-side apparatus receives multiple first weight matrices, to determine a calibration coefficient from each of the first weight matrices and to average calibration coefficients into resulting calibration coefficients; or to determine eigen vectors corresponding to the maximum eigen values of the matrices in the following equation as resulting calibration coefficients:

$$\frac{1}{Q}\sum_{q=1}^{Q} E_q E_q^H;$$

wherein Q is the number of received first weight matrices; and $E_q = [e_{q1}, e_{q2}, \ldots, e_{qN}]^T$ represents the calibration coefficients determined from the first weight matrices.

* * * * *